Aug. 11, 1959     C. F. QUICK ET AL     2,898,785
DRILL JIG
Filed April 28, 1958     2 Sheets-Sheet 1
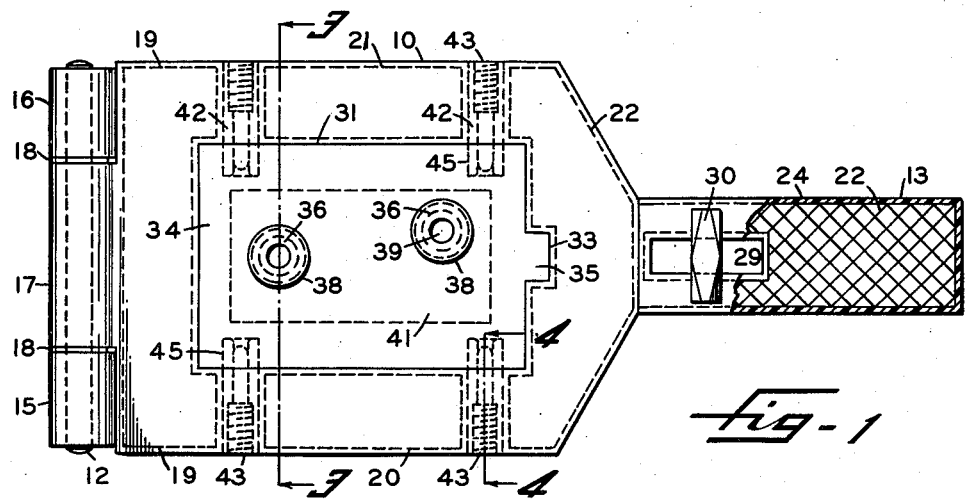
Fig-1
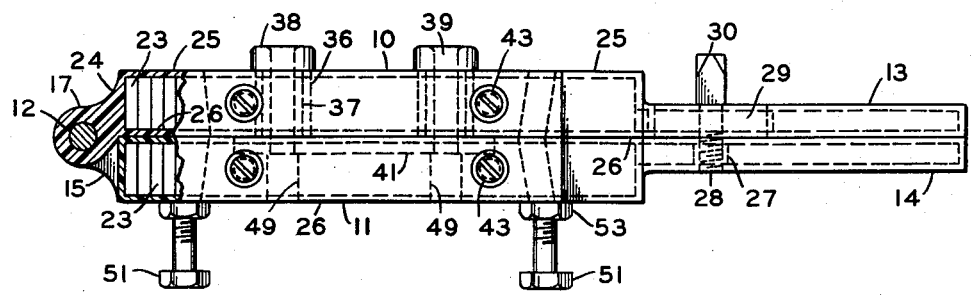
Fig-2
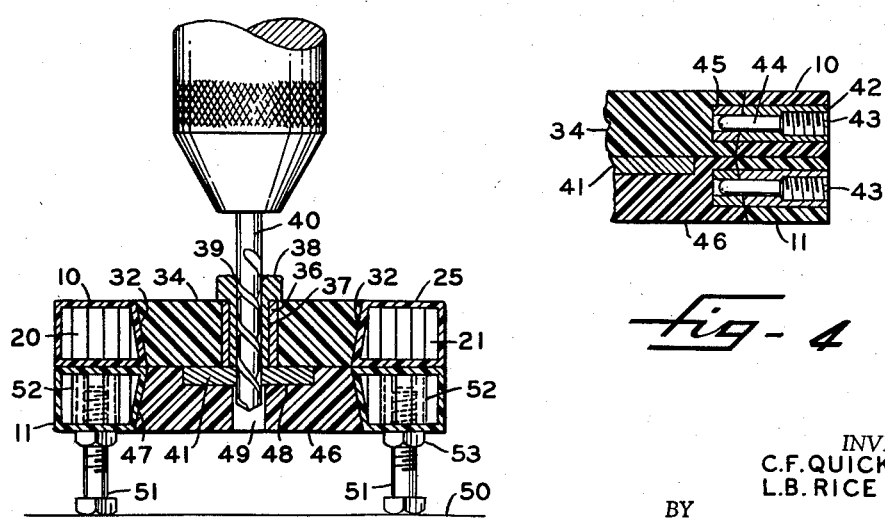
Fig-4
Fig-3
INVENTORS.
C.F. QUICK
L.B. RICE
BY
S. Tierney, Jr
ATTORNEY

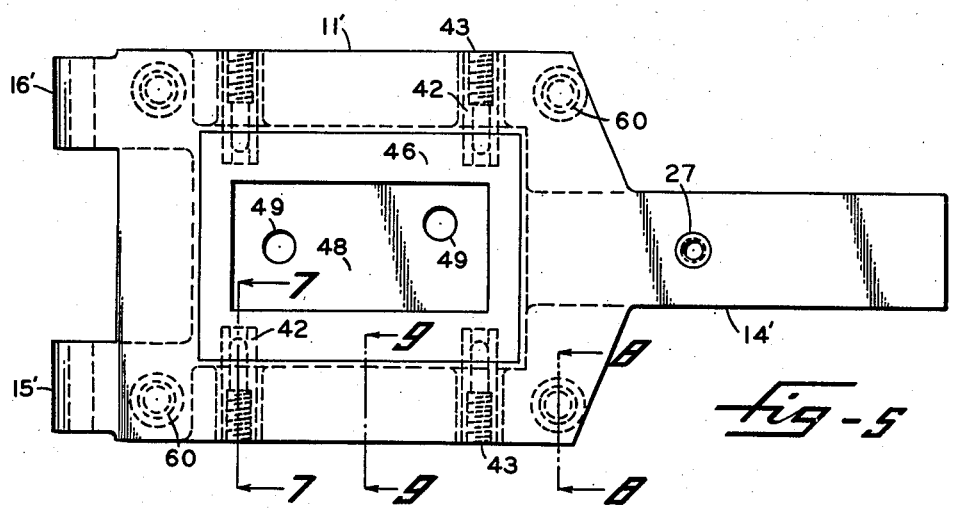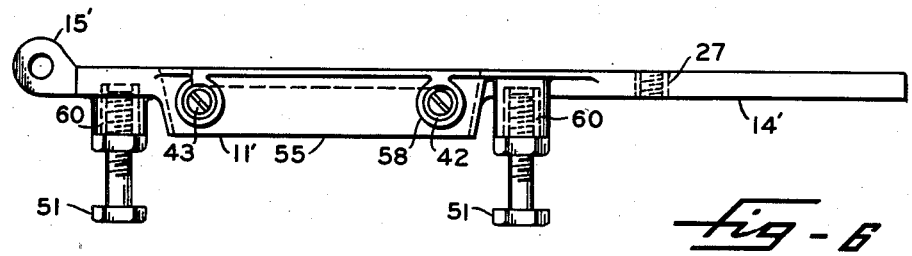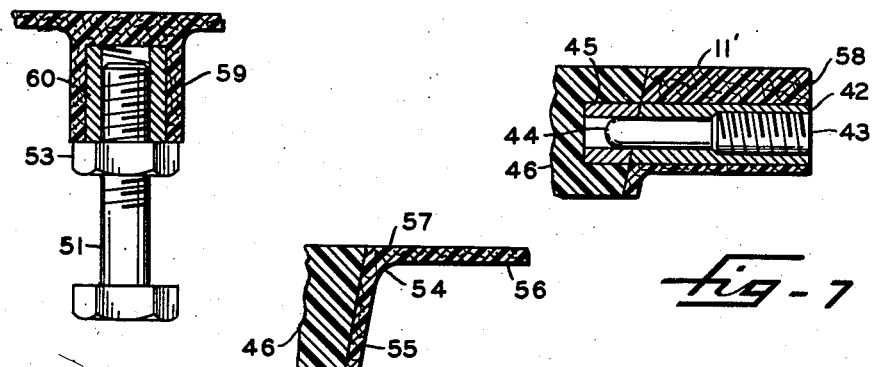

United States Patent Office 2,898,785
Patented Aug. 11, 1959

2,898,785

DRILL JIG

Carl F. Quick and Leslie B. Rice, Chula Vista, Calif., assignors to Rohr Aircraft Corporation, Chula Vista, Calif., a corporation of California Application April 28, 1958, Serial No. 731,228

12 Claims. (Cl. 77—62)

This invention relates to a drill jig useful for holding a workpiece while one or more holes are drilled at predetermined positions therein.

Such drill jigs are usually made of steel which has a specific gravity of from 7.60 to 7.80 and it is a main object of our invention to provide a drill jig of greatly decreased weight. This is done by making the major portion of the jig of a honeycomb plastic composition or a plastic reinforced by strong fibers, such as fiberglass or metal strands running through it and making inserts which carry the drill guiding bushings and workpiece of moldable plastic material. By using honeycomb in which the cell walls are made of thin cardboard or metal foil and one of the modern plastics having a specific gravity of from 1.20 to 1.40, it is possible to build a jig which weighs less than ⅕ that of a steel jig of the same shape and size.

Another object is to provide a drill jig having a main body portion comprised of two frames pivoted together at one end and which have aligned hollow center portions adapted to receive any one pair of a number of pairs of removable inserts, preferably made of light plastic material such as a polymerized resin. Each pair of removable inserts is designed for locating and drilling a particular workpiece so that the drilling of a number of workpieces of different shapes can easily be accomplished by providing a corresponding number of sets of inserts.

A further object is to provide a plurality of screw threaded locating pins for supporting and locking the inserts in their pivoted supporting frames, the locating pins being readily accessible so that they can easily be withdrawn from an insert to permit its replacement by another.

Another object is to provide a plurality of adjustable feet for levelling the drill jig and supporting it on the stationary table of a drill press at any desired distance above the table.

Other objects will become apparent as a description of the jig proceeds. For a better understanding of the invention reference is made to the accompanying drawing, in which:

Fig. 1 is a top view partly in section of a drill jig embodying the invention, the jig supporting legs being omitted for clarity;

Fig. 2 is a front view of the jig;

Fig. 3 is a sectional view of line 3—3 of Fig. 1;

Fig. 4 is a sectional view of a portion of the jig taken on line 4—4 of Fig. 1;

Fig. 5 is a top view of the bottom half of a modified form of jig;

Fig. 6 is a front view of the jig portion shown in Fig. 5;

Fig. 7 is a cross section on an enlarged scale of portions of the jig of Fig. 5 taken on line 7—7;

Figs. 8 and 9 are cross sections on an enlarged scale of portions of the jig of Fig. 5 taken on lines 8—8 and 9—9 respectively.

The jig comprises an upper frame 10 pivoted to a lower frame 11 by a metal pivot pin 12, the upper frame having an integral handle portion 13 and the lower frame a mating handle portion 14. Frames 10 and 11 are of the same general shape except that frame 11 has two integral lugs 15, 16 at one end and frame 10 an integral cylindrical shaped projection 17 which fits between the lugs to receive pivot pin 12. Preferably a pair of metal washers 18 are disposed around pin 12 between the lugs 15, 16 and projection 17 to minimize friction and wear, each washer being preferably coated with a thin film of wax or grease (not shown). In the form illustrated, each of frames 10, 11 is composed of interior sections 19, 20, 21 and 22 composed of honeycomb cells 23 having vertical walls preferably made of thin cardboard but the cells may be made of thin aluminum or other light ductile metal. Section 22 extends out into handle 13 (or 14) and the honeycomb sections are entirely surrounded by a mass 24 of hard polymerized synthetic resin which interconnects the several honeycomb sections and also provides plane upper and lower faces 25, 26 for frame members 10 and 11. Resin mass 24 is also integral with the lugs 15, 16 of frame 11 and mass 24 of frame 10 is integral with cylindrical projection 17. A threaded metal insert 27 is bonded to the plastic in handle 14 to receive the threaded end of a quarter turn lock screw 28 which passes through an elongated slot 29 in handle 13, the length of the head 30 of screw 28 being somewhat less than that of slot 29.

Near its center upper frame 10 has a vertical generally rectangular opening 31 extending from face 25 to face 26 therethrough whose plastic sidewall 32 tapers in, as shown, the opening having a small rectangular extension 33 at one end for a purpose to be described. Plastic mass 24 also forms the marginal wall of this extension. A generally rectangular insert 34 is adapted to enter opening 31 and seat against its marginal wall 32, as shown, this insert having a short lug 35 projecting from one end and adapted to fit into extension 33. Insert 34 may be made of light metal but is preferably cast of polymerized resin, as shown. Extending through insert 34 and bonded thereto when the plastic became set are a pair of metal sleeves 36 whose cylindrical walls are vertical and adapted to slidably receive the outer cylindrical walls 37 of a pair of drill bushings 38 preferably made of hard steel. Bushings 38 have the usual center holes 39 to receive a rotary drill 40 and guide it against a workpiece 41 and drill holes therethrough at predetermined positions.

To locate plastic insert 34 and secure it to frame 10, four interiorally threaded metal sleeves 42 extend through the sides of the frame and are surrounded by and bonded to the plastic of mass 24. Each sleeve has extending therethrough a threaded screw or pin 43 whose inner end 44 is cylindrical and adapted to enter a short hollow insert 45 embedded in and bonded to the plastic of insert 34 (see Fig. 4).

Lower frame 11 is constructed of the same materials as frame 10 and is of the same general construction. Its plastic insert 46, however, has a marginal wall 47 which converges upward and its top face is provided with a cavity 48 in which workpiece 41 fits. Insert 46 also has two holes 49 into which drill 40 can pass and through which chips cut by the drill can escape. Insert 46 is secured to lower frame 11 by four threaded pins 43 similar to those above described. The entire jig can be supported and leveled on the flat table 50 (Fig. 3) of a drill press by four bolts 51 whose ends screw into threaded cylindrical portions 52 of the resin mass 24. After adjustment, bolts 51 may be locked in position by lock nuts 53.

To use the jig, lock screw 28 is rotated through 90 degrees when the handle 13 can be raised and rotated through 180 degrees. A workpiece 41 is then laid in cavity 48, handle 13 rotated through 180 degrees to a position shown in Figs. 1 and 2 and lock screw 28 rotated through 90 degrees to lock the jig sections together. The entire jig is then moved along table 50 to center one bushing 38 under rotary drill 40 which is then lowered in a known manner to drill a hole through the workpiece. The drill is then raised to clear the jig and the jig moved along table 50 to center the other bushing 38 under drill 40 when the drilling operation is repeated. Drill bushings 38 can easily be removed and others substituted which fit in the sleeves 36 but whose center holes 39 are smaller or larger in diameter than drill 40 as required.

Since the specific gravity of honeycomb made of thin cardboard or aluminum foil is substantially less than 1.0, frames 10 and 11 made as above described provide a drill jig having less than 1/5 the weight of a similar jig made of steel thus providing a light jig which can be easily lifted and used by women operators. The presence of lug 35 on plastic insert 34 prevents the insertion of insert 34 in frame 10 in an opposite direction so that lug 35 provides an indexing means to assure the placement of bushings 38 in the proper predetermined positions with reference to workpiece 41. While only two sleeves 36 are provided in plastic insert 34, it will be understood that three or more may be provided in accordance with the number of holes to be drilled. In case holes close together must be drilled, drill bushings may be secured to plastic insert 46 below workpiece 41 and after the holes have been drilled by using bushings 38, the assembly is reversed and a drill passed through the other set of bushings in insert 46. Suitable supporting bolts similar to 51 may be attached to upper frame 10 to support the assembly when reversed.

Instead of having honeycomb cores, frames 10 and 11 may be cast in a mold from any of the synthetic plastics such as Bakelite, methacrylate, epoxy or other polymerizable resin. The frames may be cast by injection, compression or other known method for molding plastics.

As shown in Figs. 5 to 9, the frames may be made of laminated plastic in which a thin wall 54 may be built up around a mold of the same size and shape as insert 46, this wall being built up from one or several overlapping layers of fiber glass cloth or mat well impregnated with viscous plastic resin such as epoxy containing a catalyst which causes it to harden upon standing. This wall has a sloping portion 55 to receive and fit against insert 46 and a horizontal portion 56 whose top face 57 defines the plane top of the frame. Wall portion 56 is thicker, as indicated at 58, to enclose and anchor the four threaded sleeves 42. The plastic filled fiber glass laminations are extended to provide handle 14' and have depending cylindrical portions 59 in which are bonded threaded metal sleeves 60 which receive the bolts 51. When the plastic sets a strong unitary frame of light weight results having a specific gravity of from 1.20 to 1.40 depending on the resin used. The reinforcing material may be thin strands of metal, nylon or other material having high tensile strength instead of fiber glass.

It will be understood that a mating top frame (not shown) may be made up of plastic impregnated fiber glass laminations, such frame to have a cylindrical extension (not shown) to fit between lugs 15' and 16' and receive pivot pin 12.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. In a drill jig, in combination: upper and lower insert-supporting frames; means at one end of said frames for pivotally connecting them together, each of said frames having near the center thereof an opening extending from face to face therethrough of large area; a pair of easily detachable inserts seated against the marginal walls of said openings; the insert in the lower frame having an opening therein adapted to receive and locate the workpiece; the insert in the upper frame being provided with one or more hard metal bushings adapted to receive the lower end of a rotary drill and guide the drill against the workpiece.

2. A drill jig as claimed in claim 1, in which each of said frames is composed essentially of a honeycomb core coated with a thin film of polymerized resin.

3. A drill jig as claimed in claim 1, in which said frames are composed of polymerized resin.

4. A drill jig as claimed in claim 1, in which each of said frames is composed of a network of long fibers of high tensile strength embedded in a mass of polymerized resin.

5. A drill jig as claimed in claim 1, in which each of said inserts is composed essentially of polymerized resin.

6. A drill jig as claimed in claim 1, in which the bottom of said lower frame is provided with at least three spaced apart vertical screw threaded openings; and threaded members having their upper ends screwed into said threaded openings whereby said threaded members can be adjusted to support said lower frame in a substantially horizontal plane.

7. In a drill jig, in combination: upper and lower frames composed of rigid material whose specific gravity is less than 2.0; means at one end of said frames for pivotally connecting them together; means associated with said lower frame for supporting a workpiece at a predetermined position; said upper frame having a vertical opening extending from face to face therethrough of large area; a detachable insert composed essentially of polymerized resin seated against the marginal wall of said vertical opening; one or more vertically disposed metal tubes extending through said insert and bonded thereto, each of said metal tubes being adapted for telescopic engagement with a cylindrical drill bushing.

8. In a drill jig, in combination: upper and lower insert-supporting rigid frames, one of said frames having an integral end portion composed essentially of polymerized resin, said end portion having a pair of spaced apart projecting lugs; the other of said frames having an integral end portion composed of polymerized resin and shaped to fit between said lugs; a pivot pin extending through said last named end portion and said lugs; each of said frames having near the center thereof an opening extending from face to face therethrough of large area; a pair of easily detachable inserts seated against the marginal walls of said openings, each of said inserts being composed essentially of polymerized resin and the insert in said lower frame having an opening therein adapted to receive a workpiece; the insert in said upper frame having attached thereto and extending vertically therethrough one or more hard metal bushings adapted to receive the lower end of a rotary drill and guide the drill against the workpiece.

9. In a drill jig, in combination; upper and lower insert-supporting frames whose major portions are composed of fiberglass laminations embedded in polymerized resin; means at one end of said frames for pivotally connecting them together; each of said frames near the center thereof having an opening extending from face to face therethrough of large area and with a tapered marginal side wall; a pair of easily detachable plastic inserts seated against said marginal side walls; the insert in said lower frame having an opening to receive the workpiece and the insert in said upper frame being provided with one or more metal bushings adapted to guide the lower end of a rotary drill onto the workpiece.

10. In a drill jig, in combination; upper and lower frames composed of rigid material whose specific gravity is less than 2.0; means at one end of said frames for pivotally connecting them together; means associated with said lower frame for supporting a workpiece at a predetermined position; said upper frame having a vertical opening therethrough of large area; a detachable insert composed essentially of polymerized resin seated against the marginal wall of said vertical opening; one or more vertically disposed metal tubes extending through said insert and bonded thereto, each of said metal tubes being adapted for telescopic engagement with a cylindrical drill bushing; said upper frame having at each of two opposite sides a pair of threaded metal sleeves disposed in a horizontal plane, and said detachable insert having embedded therein at its edge a plurality of metal inserts aligned with said sleeves; and a plurality of screw threaded locating pins in threaded engagement with said threaded sleeves and with their inner ends seated in said metal inserts.

11. In a drill jig, in combination: a pair of hinged frames each having inner and outer faces, the inner faces of said frames being plane and movable into face adjacency with each other when the frames are closed together; means for releasably locking the frames together; said frames respectively having central openings which are aligned when the frames are closed; said openings extending between the inner and outer faces of the frames individual thereto; a pair of inserts each having inner and outer faces and receivable respectively within said central openings; means for releasably securing said inserts in position within said openings with the inner faces of the inserts flush with the inner surfaces of the frames individual thereto; and at least one drill bushing mounted in one of said inserts and having a drill-receiving hole extending between its inner and outer surfaces; the other of said inserts having a cavity in the inner surface thereof for nesting a part to be drilled therein for engagement by the end of a drill passed through said bushing hole, said other of the inserts having a hole therein extending from said cavity to its outer surface for receiving the drill and for escape of chips cut thereby.

12. In a drill jig as in claim 11 and further comprising indexing means providing for predetermined positioning of said inserts within said openings.

References Cited in the file of this patent

UNITED STATES PATENTS

| | | |
|---|---|---|
| 2,380,291 | Cameron | July 10, 1945 |
| 2,728,249 | Stein et al. | Dec. 27, 1955 |

OTHER REFERENCES

"Jigs and Dies from Cast Plastics," "American Machinist" magazine, page 731, July 9, 1942.